US011321937B1

(12) United States Patent
Jiang et al.

(10) Patent No.: US 11,321,937 B1
(45) Date of Patent: May 3, 2022

(54) VISUAL LOCALIZATION METHOD AND APPARATUS BASED ON SEMANTIC ERROR IMAGE

(71) Applicant: National University of Defense Technology, Hunan (CN)

(72) Inventors: Jie Jiang, Hunan (CN); Xing Xin, Hunan (CN); Lai Kang, Hunan (CN); Yin Zou, Hunan (CN); Yujie Fang, Hunan (CN); Yingmei Wei, Hunan (CN); Yuxiang Xie, Hunan (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 17/473,190

(22) Filed: Sep. 13, 2021

(30) Foreign Application Priority Data

Nov. 2, 2020 (CN) .......................... 202011199775.8

(51) Int. Cl.
*G06V 10/40* (2022.01)
*G06T 7/73* (2017.01)
(Continued)

(52) U.S. Cl.
CPC .............. *G06V 10/40* (2022.01); *G06T 7/136* (2017.01); *G06T 7/75* (2017.01); *G06V 30/274* (2022.01)

(58) Field of Classification Search
CPC ........ G06V 30/274; G06V 10/40; G06T 7/75; G06T 7/136
See application file for complete search history.

(56) References Cited

U.S. PATENT DOCUMENTS 10,002,460 B2 * 6/2018 Black .................. G06V 40/103
10,366,508 B1 7/2019 Liu et al.
(Continued)

FOREIGN PATENT DOCUMENTS

CN 106803275 A 6/2017
CN 107063258 A 8/2017
(Continued)

*Primary Examiner* — Mia M Thomas
(74) *Attorney, Agent, or Firm* — Dragon Sun Law Firm, PC; Jinggao Li, Esq.

(57) ABSTRACT

The present disclosure provides a visual localization method and apparatus based on a semantic error image. The method includes: performing feature extraction for a target image, and obtaining at least one matching pair by performing feature matching for each extracted feature point and each three-dimensional point of a constructed three-dimensional scene model; obtaining a two-dimensional semantic image of the target image by performing semantic segmentation for the target image; and determining semantic information of each matching pair according to semantic information of each pixel of the two-dimensional semantic image; constructing a hypothesized pose pool including at least one hypothesized pose according to at least one matching pair; for each hypothesized pose, constructing a reprojection error image and a semantic error image; determining a hypothesized pose with a minimum reprojection error and a minimum semantic error as a pose estimation according to the reprojection error image and the semantic error image of each hypothesized pose. Optimal pose screening is performed using the semantic error image constructed based on a semantic error, so as to achieve good localization effect even in a case of significant change of a scene.

10 Claims, 2 Drawing Sheets

(51) Int. Cl.
*G06T 7/136* (2017.01)
*G06V 30/262* (2022.01)

(56) References Cited

U.S. PATENT DOCUMENTS

| | | | | |
|---|---|---|---|---|
| 10,482,618 | B2* | 11/2019 | Jain | G06T 7/13 |
| 10,540,577 | B2* | 1/2020 | Taylor | G01C 11/06 |
| 10,600,210 | B1 | 3/2020 | Citraro et al. | |
| 10,657,391 | B2* | 5/2020 | Chen | G06K 9/6272 |
| 10,685,446 | B2* | 6/2020 | Fleishman | G06T 7/579 |
| 11,094,082 | B2* | 8/2021 | Yamazaki | G06T 7/75 |
| 11,107,244 | B1* | 8/2021 | Warnaar | G06T 7/60 |
| 2012/0082371 | A1* | 4/2012 | Bengio | G06K 9/6282 |
| | | | | 382/159 |
| 2014/0198986 | A1* | 7/2014 | Marchesotti | G06V 20/35 |
| | | | | 382/190 |
| 2016/0085310 | A1* | 3/2016 | Shotton | G06F 3/0304 |
| | | | | 382/103 |
| 2016/0203361 | A1* | 7/2016 | Black | G06T 7/77 |
| | | | | 382/203 |
| 2017/0124713 | A1* | 5/2017 | Jurgenson | G06T 7/246 |
| 2018/0189565 | A1* | 7/2018 | Lukierski | G06T 7/74 |
| 2018/0307310 | A1* | 10/2018 | McCombe | H04N 5/23229 |
| 2019/0130214 | A1* | 5/2019 | N | G06N 3/04 |
| 2019/0147221 | A1* | 5/2019 | Grabner | G06K 9/6215 |
| | | | | 382/103 |
| 2019/0166359 | A1* | 5/2019 | Lapstun | H04N 13/383 |
| 2019/0172223 | A1* | 6/2019 | Vajda | G06V 40/103 |
| 2019/0295261 | A1* | 9/2019 | Kang | G06V 10/82 |
| 2019/0304134 | A1* | 10/2019 | Mauchly | G06N 3/0454 |
| 2019/0304170 | A1* | 10/2019 | Meilland | G06T 15/20 |
| 2019/0311478 | A1* | 10/2019 | Avendi | G06T 7/11 |
| 2019/0317850 | A1* | 10/2019 | Chau | G06F 9/451 |
| 2020/0005521 | A1* | 1/2020 | Youngquist | G06T 15/20 |
| 2020/0043190 | A1* | 2/2020 | Tanner | G06T 5/002 |
| 2020/0104969 | A1* | 4/2020 | Aratani | G06T 7/73 |
| 2020/0111233 | A1* | 4/2020 | Thyagharajan | G06T 7/246 |
| 2020/0126257 | A1* | 4/2020 | Tauber | G06T 15/205 |
| 2020/0302584 | A1* | 9/2020 | Zhang | G06T 7/001 |
| 2020/0311871 | A1* | 10/2020 | Yu | G06T 3/4053 |
| 2021/0074019 | A1* | 3/2021 | Chen | G06V 30/194 |
| 2021/0089572 | A1* | 3/2021 | Lawlor | G06F 16/587 |
| 2021/0166477 | A1* | 6/2021 | Bunkasem | G06K 9/6223 |
| 2021/0232851 | A1* | 7/2021 | Redford | G06K 9/6273 |
| 2021/0270722 | A1* | 9/2021 | Chou | G06V 20/69 |
| 2021/0398320 | A1* | 12/2021 | Thyagharajan | G06T 7/80 |

FOREIGN PATENT DOCUMENTS

| | | |
|---|---|---|
| CN | 108416840 A | 8/2018 |
| CN | 110303000 A | 11/2019 |
| EP | 3114833 A1 | 1/2017 |

\* cited by examiner

VISUAL LOCALIZATION METHOD AND APPARATUS BASED ON SEMANTIC ERROR IMAGE

TECHNICAL FIELD

One or more embodiments of the present disclosure relates to the field of image processing technologies and in particular to a visual localization method and apparatus based on a semantic error image.

BACKGROUND

Visual localization is to obtain a spatial position and an orientation of a target, i.e. a pose estimation of the target, by obtaining information around the target based on data such as image and three-dimensional point clouds. Therefore, the visual localization is widely applied in localization and navigation of robots, navigation of self-driving vehicles, augmented reality and three-dimensional reconstruction and the like.

At present, the visual localization method usually includes the following three methods: the first method is a localization method based on three-dimensional structure, in which a localization accuracy will be significantly reduced and even failed in the cases of significant change of scene environment, presence of a large number of repetitive structures in the scene, weak texture or texture-less structure of the scene, change of strong light irradiation, motion blur and change of strong view point and the like; the second method is a localization method based on an image, in which a pose estimation is performed by searching out an image most similar to a target image in an image database, leading to a low localization accuracy; the third method is a localization method based on a learning model, in which a learning model is trained in advance and a pose estimation is performed using the model, wherein the method cannot process a large scene and lacks generality when a model is constructed for each scene. Image similarity retrieval is present in all the above methods. Thus, in an actual application, change factors such as light and season will have a huge impact on a scene, and structural overlaps between images are significantly reduced, leading to a lower localization effect.

SUMMARY

In view of this, one or more embodiments of the present disclosure aim to provide a visual localization method and apparatus based on a semantic error image, in which a high localization accuracy can be generated in a case of significant change of a scene.

Based on the above object, one or more embodiments of the present disclosure provide a visual localization method based on a semantic error image, including:

performing feature extraction for a target image, and obtaining at least one matching pair by performing feature matching for each extracted feature point and each three-dimensional point of a constructed three-dimensional scene model, wherein each matching pair includes a pixel point of the target image and the three-dimensional point of the three-dimensional scene model which are matched in feature;

obtaining a two-dimensional semantic image of the target image by performing semantic segmentation for the target image, wherein each pixel point of the two-dimensional semantic image has corresponding semantic information; and determining semantic information of each matching pair according to the semantic information of each pixel of the two-dimensional semantic image;

constructing a hypothesized pose pool including at least one hypothesized pose according to at least one matching pair;

for each hypothesized pose in the hypothesized pose pool, constructing a reprojection error image and a semantic error image; wherein the semantic error image is obtained in the following manner: constructing a three-dimensional semantic image by using the three-dimensional points in all matching pairs, obtaining a two-dimensional image by performing reprojection for the three-dimensional semantic image according to a current hypothesized pose, assigning semantic information of each theoretical pixel point of the two-dimensional image to the semantic information of the corresponding pixel point of the two-dimensional semantic image, and then constructing the semantic error image based on a semantic error between the semantic information of each theoretical pixel point of the two-dimensional image and the semantic information of the correspondingly-matched three-dimensional point;

determining a hypothesized pose with a minimum reprojection error and a minimum semantic error as a pose estimation according to the reprojection error image and the semantic error image of each hypothesized pose.

Optionally, the hypothesized pose pool is constructed in the following manner:

selecting four matching pairs randomly from all matching pairs, obtaining one hypothesized pose through calculation according to a PNP (perspective-n-point) algorithm and the four selected matching pairs, and constructing the hypothesized pose pool by using all hypothesized poses obtained based on the random combination of all matching pairs.

Optionally, the hypothesized pose is calculated in the following formula:

$$h_1 = -R^{-1} * t \qquad (5)$$

where R is a rotation matrix and t is a translation matrix.

Optionally, selecting the hypothesized pose with the minimum reprojection error and the minimum semantic error as the pose estimation according to the reprojection error image and the semantic error image of each hypothesized pose includes:

calculating a total number of correct positions according to the reprojection error image corresponding to each hypothesized pose;

calculating a total number of correct semantics according to the semantic error image corresponding to each hypothesized pose;

selecting a hypothesized pose with the maximum total number of correct positions and the maximum total number of correct semantics as an optimal pose estimation.

Optionally, calculating the total number of correct positions according to the reprojection error image corresponding to each hypothesized pose includes the followings:

for each hypothesized pose $h_j$, $j=1, 2 \ldots n$, n is a number of hypothesized poses in the hypothesized pose pool, the three-dimensional semantic image is reprojected as the two-dimensional image according to the hypothesized pose $h_j$, wherein based on a position coordinate $y_i$ of any three-dimensional point i, a theoretical position coordinate $p'_i$ of the theoretical pixel point i' of the two-dimensional image obtained through projection is expressed as follows:

$$p'_i = Ch_j y_i = Ch_j \begin{bmatrix} X_i \\ Y_i \\ Z_i \end{bmatrix} \quad (6)$$

wherein $X_i$, $Y_i$ and $Z_i$ are the position coordinates of the three-dimensional point i in x, y and z directions, and C is a camera projection matrix;

a reprojection error $e_i$ present between the theoretical position coordinate $p'_i$ of the theoretical pixel point i' of the two-dimensional image and an actual position coordinate $p_i$ a the pixel point i of the two-dimensional semantic image is expressed as follows:

$$e_i = \|p_i - p'_i\| = \|p_i - Ch_j y_i\| \quad (7)$$

the reprojection error image is constructed based on the reprojection error $e_i$ and an inlier threshold $\tau$ of the matching pair is set, such that, $$n_i = \begin{cases} 1, & e_i < \tau \\ 0, & e_i \geq \tau \end{cases} \quad (8)$$

if the reprojection error $e_i$ is smaller than the inlier threshold $\tau$, the theoretical pixel point of the two-dimensional image obtained through projection based on the hypothesized pose is consistent in position with the corresponding pixel point of the two-dimensional semantic image, which is called correct position;

for the reprojection error image corresponding to each hypothesized pose, a total number $N_i$ of inliers is calculated and the total number of correct positions is calculated as follows:

$$N_i = \Sigma n_i \quad (9)$$

Optionally, calculating the total number of correct semantics according to the semantic error image corresponding to each hypothesized pose includes:

determining a semantic error $m_i$ present between the semantic information of the theoretical pixel point of the two-dimensional image and the semantic information of the three-dimensional point;

$$m_i = \begin{cases} 1, & \text{semantic information same} \\ 0, & \text{semantic information different} \end{cases} \quad (10)$$

for the semantic error image corresponding to each hypothesized pose, calculating the total number of the correct semantics $M_i$:

$$M_i = \Sigma m_i \quad (11)$$

An embodiment of the present disclosure further provides a visual localization apparatus based on a semantic error image, including:

a matching module, configured to perform feature extraction for a target image, and obtain at least one matching pair by performing feature matching for each extracted feature point and each three-dimensional point of a constructed three-dimensional scene model, wherein each matching pair includes a pixel point of the target image and the three-dimensional point of the three-dimensional scene model which are matched in feature;

a semantic segmenting module, configured to: obtain a two-dimensional semantic image of the target image by performing semantic segmentation for the target image, wherein each pixel point of the two-dimensional semantic image has corresponding semantic information; and determine semantic information of each matching pair according to the semantic information of each pixel of the two-dimensional semantic image;

a pose pool constructing module, configured to construct a hypothesized pose pool including at least one hypothesized pose according to at least one matching pair;

an image constructing module, configured to, for each hypothesized pose in the hypothesized pose pool, construct a reprojection error image and a semantic error image; wherein the semantic error image is obtained in the following manner: constructing a three-dimensional semantic image by using the three-dimensional points in all matching pairs, obtaining a two-dimensional image by performing reprojection for the three-dimensional semantic image according to a current hypothesized pose, assigning semantic information of each theoretical pixel point of the two-dimensional image to the semantic information of the corresponding pixel point of the two-dimensional semantic image, and then constructing the semantic error image based on a semantic error between the semantic information of each theoretical pixel point of the two-dimensional image and the semantic information of the correspondingly-matched three-dimensional point; and a pose estimating module, configured to determine a hypothesized pose with a minimum reprojection error and a minimum semantic error as a pose estimation according to the reprojection error image and the semantic error image of each hypothesized pose.

Optionally, the pose pool constructing module is configured to: select four matching pairs randomly from all matching pairs, obtain one hypothesized pose through calculation according to a PNP (perspective-n-point) algorithm and the four selected matching pairs, and construct the hypothesized pose pool by using all hypothesized poses obtained based on the random combination of all matching pairs.

Optionally, the hypothesized pose is calculated in the following formula:

$$h_1 = -R^{-1} * t \quad (5)$$

wherein R is a rotation matrix and t is a translation matrix.

Optionally, the pose estimating module is configured to: calculate a total number of correct positions according to the reprojection error image corresponding to each hypothesized pose; calculate a total number of correct semantics according to the semantic error image corresponding to each hypothesized pose; and select a hypothesized pose with a maximum total number of correct positions and a maximum total number of correct semantics as an optimal pose estimation.

As can be seen from the above, in the visual localization method and apparatus based on a semantic error image according to one or more embodiments of the present disclosure, feature extraction is performed for a target image, and at least one matching pair is obtained by performing feature matching for each extracted feature point and each three-dimensional point of a constructed three-dimensional scene model; a two-dimensional semantic image of the target image is obtained by performing semantic segmentation for the target image, and semantic information of each matching pair is determined according to semantic information of each pixel of the two-dimensional semantic image; a hypothesized pose pool including at least one hypothesized pose is constructed according to each matching pair; a reprojection error image and a semantic error image are constructed for each hypothesized pose in the hypothesized pose pool; a hypothesized pose with a minimum reprojection error and a minimum semantic error is determined as a pose estimation according to the reprojection error image and the semantic error image of each hypothesized pose. According to the semantic error image constructed based on the semantic error, optimal pose screening is performed, so as to achieve good localization effect even in a case of significant change of scene.

BRIEF DESCRIPTIONS OF THE DRAWINGS

In order to describe the technical solutions in one or more embodiments of the present disclosure or the prior art more clearly, the accompanying drawings required for descriptions of the embodiments or prior art will be briefly introduced below. Apparently, the accompanying drawings described below are merely one or more embodiments of the present disclosure. Other drawings may be obtained by those skilled in the art based on these accompanying drawings without paying creative work.

DETAILED DESCRIPTIONS OF EMBODIMENTS

To make the subject, the technical solutions and advantages of the present disclosure clearer and understandable, the present disclosure will be further described in combination with specific embodiments and accompanying drawings.

It should be noted that unless otherwise defined, the technical terms or scientific terms used in one or more embodiments of the present disclosure shall have general meanings that can be understood by persons of ordinary skills in the art. "First", "second" and similar words used in one or more embodiments of the present disclosure do not represent any sequence, number or importance but distinguish different components. The terms such as "including" and "containing" mean that an element or article appearing before the words covers an element or article or their equivalents appearing after the words and does not preclude other elements or articles. The terms such as "connect" or "coupling" are not limited to physical or mechanical connection, but may include direct or indirect electrical connection. The terms such as "upper", "lower", "left" and "right" are used only to represent relative positional relationship, and when an absolute position of the described object changes, the relative positional relationship will change accordingly.

Figure 1:
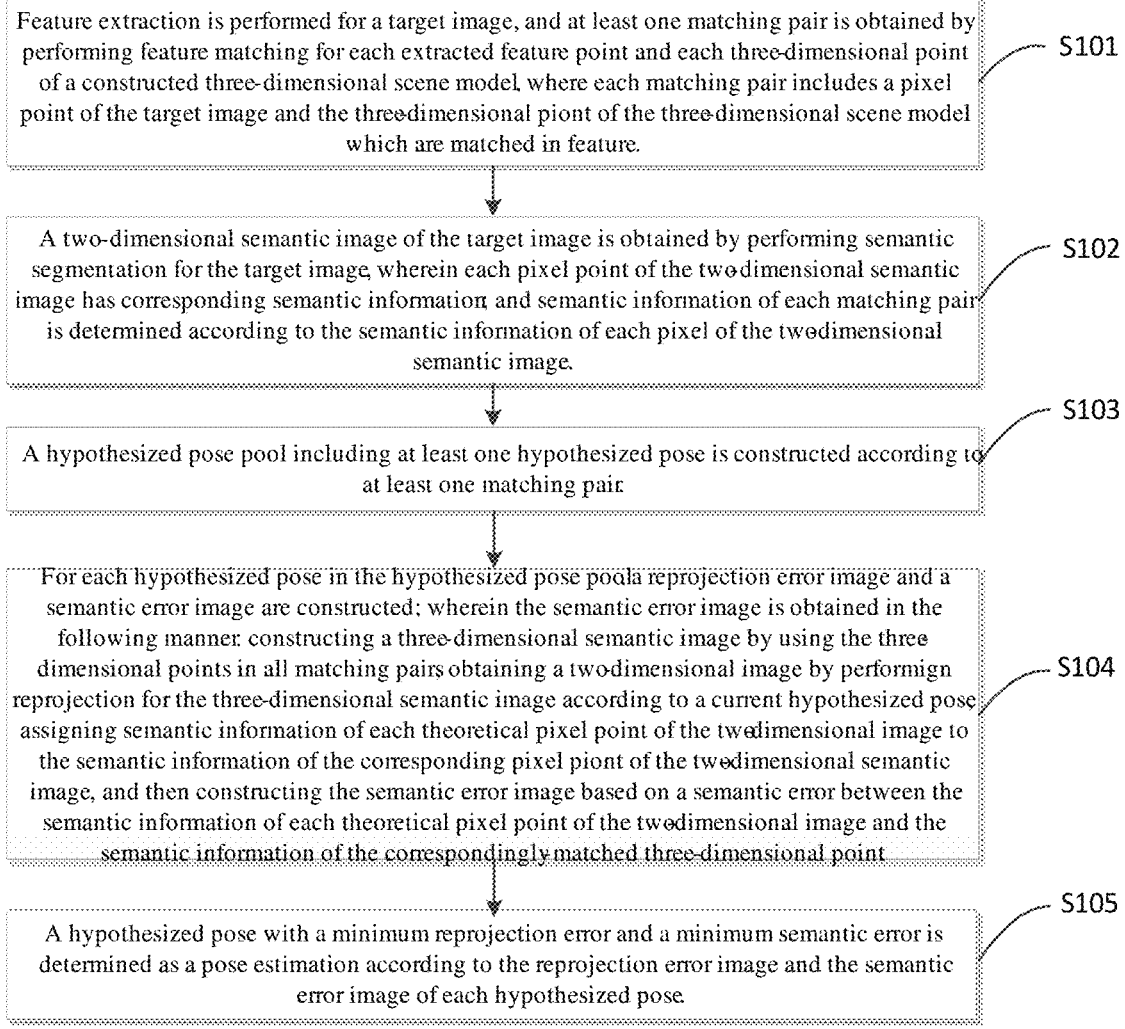
FIG. 1 is a flowchart of a method according to one or more embodiments of the present disclosure.

As shown in FIG. 1, one or more embodiments of the present disclosure provide a visual localization method based on a semantic error image, including:

At step S101, feature extraction is performed for a target image, and at least one matching pair is obtained by performing feature matching for each extracted feature point and each three-dimensional point of a constructed three-dimensional scene model, where each matching pair includes a pixel point of the target image and the three-dimensional point of the three-dimensional scene model which are matched in feature.

In this embodiment, the three-dimensional scene model is built using a plurality of images in a dataset based on an incremental Structure From Motion (SFM) algorithm (e.g. COLMAP method). With unordered images as input and siftGPU as local feature, the three-dimensional scene model is built during feature extraction. Afterwards, the local feature of each image and all information of the three-dimensional points in the three-dimensional scene model are stored separately for subsequent management and use.

A plurality of feature points are obtained by performing feature extraction for the target image, and at least one matching pair matched in feature is obtained by performing feature matching for each feature point and each three-dimensional point of the three-dimensional scene model.

In some embodiments, feature matching of the two-dimensional feature point and the three-dimensional point may be performed based on Approximate Nearest Neighbor Search algorithm to search and determine the feature point and the three-dimensional point matched in feature. During the search, a loose error threshold, for example, 0.9, may be set in order to improve a successful matching rate.

At step S102, a two-dimensional semantic image of the target image is obtained by performing semantic segmentation for the target image, wherein each pixel point of the two-dimensional semantic image has corresponding semantic information; and semantic information of each matching pair is determined according to the semantic information of each pixel of the two-dimensional semantic image.

In this embodiment, the two-dimensional semantic image after semantic segmentation and the semantic information of each pixel point of the two-dimensional semantic image may be obtained by performing semantic segmentation for the target image. After the semantic information of each pixel point is determined, the semantic information of each pixel point in each matching pair is taken as semantic information of the matching pair and as semantic information of the three-dimensional point in the matching pair.

At step S103, a hypothesized pose pool including at least one hypothesized pose is constructed according to at least one matching pair.

In this embodiment, the hypothesized pose pool is constructed based on PNP (perspective-n-point) algorithm according to each matching pair. The hypothesized pose pool includes at least one hypothesized pose, and each hypothesized pose is determined based on four randomly-selected matching pairs.

At step S104, for each hypothesized pose in the hypothesized pose pool, a reprojection error image and a semantic error image are constructed; wherein the semantic error image is obtained in the following manner: constructing a three-dimensional semantic image by using the three-dimensional points in all matching pairs, obtaining a two-dimensional image by performing reprojection for the three-dimensional semantic image according to a current hypothesized pose, assigning semantic information of each theoretical pixel point of the two-dimensional image to the semantic information of the corresponding pixel point of the two-dimensional semantic image, and then constructing the semantic error image based on a semantic error between the semantic information of each theoretical pixel point of the two-dimensional image and the semantic information of the correspondingly-matched three-dimensional point.

In this embodiment, based on the constructed hypothesized pose pool, corresponding reprojection error image and semantic error image are constructed for each hypothesized pose. The three-dimensional semantic image is constructed using three-dimensional points in all matching pairs. The reprojection error image is obtained in the following manner: obtaining the two-dimensional image by performing reprojection for the three-dimensional semantic image according to a current hypothesized pose and constructing the reprojection error image based on a position error between the theoretical position of each theoretical pixel point of the two-dimensional image and the actual position of the corresponding pixel point of the two-dimensional semantic image. The semantic error image is obtained in the following manner: assigning semantic information of each theoretical pixel point of the two-dimensional image to the semantic information of the corresponding pixel point of the two-dimensional semantic image, and then constructing the semantic error image based on a semantic error between the semantic information of each theoretical pixel point of the two-dimensional image and the semantic information of the correspondingly-matched three-dimensional point.

At step S105, a hypothesized pose with a minimum reprojection error and a minimum semantic error is determined as a pose estimation according to the reprojection error image and the semantic error image of each hypothesized pose.

In this embodiment, after the reprojection error image and the semantic error image corresponding to each hypothesized pose are determined, a total number of correct positions is calculated according to the reprojection error image corresponding to each hypothesized pose, where a larger total number of correction positions means a smaller reprojection error; and a total number of correct semantics is calculated according to the semantic error image corresponding to each hypothesized pose, where a larger total number of correct semantics means a smaller semantic error. Afterwards, a hypothesized pose with a maximum total number of correct positions and a maximum total number of correct semantics is selected as an optimal pose estimation.

In the visual localization method based on a semantic error image according to one or more embodiments of the present disclosure, feature extraction is performed for a target image, and at least one matching pair is obtained by performing feature matching for each extracted feature point and each three-dimensional point of a constructed three-dimensional scene model; a two-dimensional semantic image of the target image is obtained by performing semantic segmentation for the target image where each pixel point of the two-dimensional semantic image has corresponding semantic information; semantic information of each matching pair is determined according to semantic information of each pixel of the two-dimensional semantic image; a hypothesized pose pool including at least one hypothesized pose is constructed according to each matching pair; a reprojection error image and a semantic error image are constructed for each hypothesized pose in the hypothesized pose pool; a hypothesized pose with a minimum reprojection error and a minimum semantic error is determined as a pose estimation according to the reprojection error image and the semantic error image of each hypothesized pose. The visual localization method of the embodiment introduces semantic information of scene to perform optimal pose screening based on the semantic error image constructed using the semantic error, so as to achieve a good localization effect even in a case of significant change of scene.

The visual localization method of the embodiment will be detailed below in combination with the accompanying drawings and specific embodiments.

In some embodiments, in step S102, the target image is a RGB image. The two-dimensional semantic image may be obtained by performing segmentation for the target image using an image segmentation network signet. The image segmentation network signet includes an encoder and a decoder. The encoder uses a convolutional layer and a pooling layer alternately, the decoder uses a convolutional layer and an upsampling layer alternately, and pixel classification employs a Softmax classifier. In a encoding and decoding process, a pooling index (placement information of a pooling process) is transmitted to the decoder to improve an image segmentation rate. The key of the image segmentation network signet lies in bottom sampling and top sampling. During an upsampling process, a maximum pixel position index recorded in a downsampling process is used, one batch normalization layer is added after each convolutional layer, and a Rectified Linear Units (ReLu) activation layer is added after the batch normalization layer, so as to improve the image segmentation effect.

A max-pooling can realize translation invariance when a small spatial displacement is performed on the input target image. Due to continuous downsampling, a large quantity of spatial information of the target image is overlapped on each pixel of an output feature map. For an image classification task, the multi-layer max-pooling and the downsampling can achieve better robustness due to translation invariance. However, loss of feature map size and spatial information occurs. After downsampling, all encoders only store the max-pooling indices during feature mapping, that is, store a position of a maximum feature value in each pooling window for feature mapping of each encoder.

In step S103, the hypothesized pose pool including at least one hypothesized pose is constructed according to at least one matching pair in the following manner:

There are four major coordinate systems in a matching process of the pixel point and the three-dimensional point: world coordinate system O-XYZ, camera coordinate system $O_c$-$X_c Y_c Z_c$, plane coordinate system O-xy, pixel coordinate system uv. The pixel coordinate (u, v) and the plane coordinate (x, y, z) are subjected to coordinate transformation as follows:

$$\begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} x \\ y \\ 1 \end{bmatrix} \quad (1)$$

where lengths of each pixel in an x axis direction and a y axis direction are dx and dy respectively, and the coordinate of the pixel under the plane coordinate system is ($u_0$, $v_0$).

By analogy reasoning, a transforamtion relationship between the pixel coordinate (u, v) and the world coordinate (X, Y, Z) is finally obtained:

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad (2)$$

$$R = \begin{bmatrix} r_{11} & r_{12} & r_{13} \\ r_{21} & r_{22} & r_{23} \\ r_{31} & r_{32} & r_{33} \end{bmatrix} \quad (3)$$

$$t = \begin{bmatrix} t_1 \\ t_2 \\ t_3 \end{bmatrix} \quad (4)$$

where $C_x$ and $C_y$ are a position of a center point in the pixel coordinate system, $f_x$ and $f_y$ are focal distance, S is a coordinate axis tilt parameter, R is a rotation matrix, and t is a translation matrix, where R and t are an extrinsic matrix of a camera.

One group of hypothesized poses can be calculated by randomly selecting four matching pairs based on the PNP algorithm and the above coordinate transformation relationship. The hypothesized pose $h_1$ can be obtained according to the pixel coordinate (u, v) and the world coordinate (X, Y, Z) of the four matching pairs in the following formula:

$$h_1 = -R^{-1} * t \quad (5)$$

Based on the above principle, a corresponding hypothesized pose is calculated according to four matching pairs randomly selected from all matching pairs, a plurality of hypothesized poses are obtained by performing calculation based on random combination of all patching pairs, and the hypothesized pose pool is constructed using all hypothesized poses.

In some embodiments, in step S104, the reprojection error image is constructed in the following manner.

For the position coordinate of the matching pair $(p_i, y_i)$, the actual position coordinate of the pixel point i of the two-dimensional semantic image is $p_i$, and the position coordinate of the three-dimensional point i of the three-dimensional semantic image is $y_i$. One hypothesized pose $h_j$ may be obtained by selecting four matching pairs randomly each time based on the PNP algorithm, a plurality of hypothesized poses may be obtained based on random combination of all matching pairs, and the hypothesized pose pool $h_n$ may be constructed using all hypothesized poses, where n is a number of hypothesized poses in the hypothesized pose pool.

For each hypothesized pose $h_j$, j=1, 2 . . . n. When the hypothesized pose $h_j$ is a correct pose, the three-dimensional semantic image is reprojected as a two-dimensional image according to the hypothesized pose $h_j$. Under the hypothesized pose $h_j$, based on the position coordinate $y_i$ of any three-dimensional point, the theoretical positon coordinate $p'_i$ of the theoretical pixel point i' of the two-dimensional image obtained through projection is expressed as follows:

$$p'_i = Ch_j y_i = Ch_j \begin{bmatrix} X_i \\ Y_i \\ Z_i \end{bmatrix} \quad (6)$$

where $X_i$, $Y_i$ and $Z_i$ are the position coordinates of the three-dimensional point i in x, y and z directions, and C is a camera projection matrix.

Because the hypothesized pose is not surely a correct pose, a reprojection error $e_i$ present between the theoretical position coordinate $p'_i$ of the theoretical pixel point i' of the two-dimensional image and the actual position coordinate $p_i$ of the pixel point i of the two-dimensional semantic image is expressed as follows:

$$e_i = \|p_i - p'_i\| = \|p_i - Ch_j y_i\| \quad (7)$$

The reprojection error image is constructed based on the reprojection error present between the theoretical position coordinate $p'_i$ and the actual position coordinate $p_i$. For the reprojection error image, an inlier threshold $\tau$ of the matching pair is set, such that, $$n_i = \begin{cases} 1, & e_i < \tau \\ 0, & e_i \geq \tau \end{cases} \quad (8)$$

According to the formula (7), if the reprojection error $e_i$ is smaller than the inlier threshold $\tau$, the inlier value $n_i$ is 1, and the matching pair $(p_i, y_i)$ is an inlier, which represents that the theoretical pixel point of the two-dimensional image obtained through projection according to the hypothesized pose is consistent in position with the corresponding pixel point of the two-dimensional semantic image, which is called correct position. If the reprojection error $e_i$ is greater than or equal to the inlier threshold $\tau$, the inlier value $n_i$ is 0.

for the reprojection error image corresponding to each hypothesized pose, a total number $N_i$ of inliers is calculated and the total number of correct positions is calculated as follows:

$$N_i = \Sigma n_i \quad (9)$$

The semantic error image is further constructed in the following manner: determining semantic information of the pixel point of the corresponding position of the two-dimensional semantic image according to the theoretical position coordinate $p'_i$ of the theoretical pixel point of the two-dimensional image, and taking the determined semantic information as semantic information of the theoretical pixel point of the two-dimensional image; determining a semantic error between the semantic information of each theoretical pixel point of the two-dimensional image and the semantic information of each matched three-dimensional point according to the semantic information of each theoretical pixel point of the two-dimensional image; constructing the semantic error image according to the semantic error between the semantic information of each theoretical pixel point and the semantic information of each matched three-dimensional point.

Figure 2:
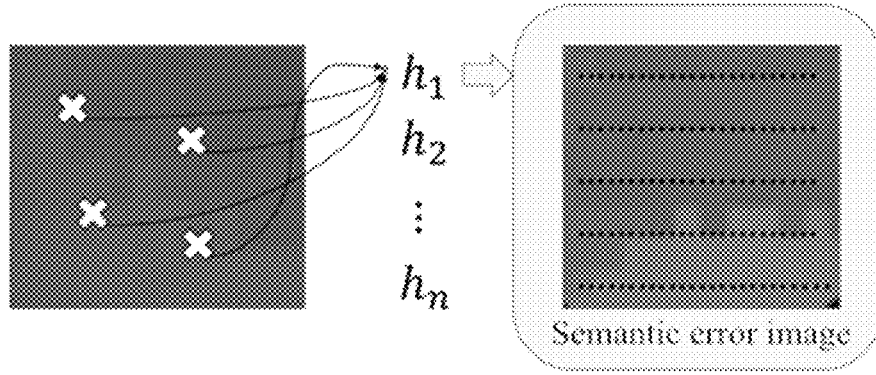
FIG. 2 is a schematic diagram of a semantic error image according to one or more embodiments of the present disclosure.
Figure 3:
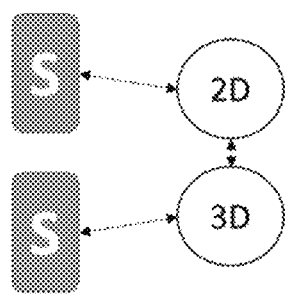
FIG. 3 is a schematic diagram of a matching pair according to one or more embodiments of the present disclosure.
Figure 4:
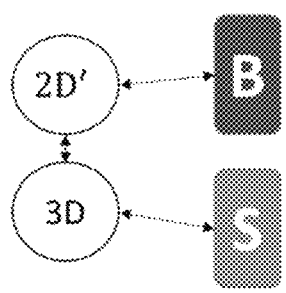
FIG. 4 is a schematic diagram of semantic information of a theoretical pixel point and a three-dimensional point according to one or more embodiments of the present disclosure.

As shown in FIGS. 2-4, the semantic information of the pixel point (2D) and the three-dimensional point (3D) in the matching pair is S (e.g. S is sky). After the two-dimensional image is obtained by performing reprojection for the three-dimensional semantic image according to the hypothesized pose, the theoretical pixel point (2D) and three-dimensional point of the theoretical matching pair are obtained. According to the theoretical position coordinate of the theoretical pixel point, the semantic information (for example, B is a building) of the pixel point of the corresponding position of the two-dimensional semantic image is determined. The determined semantic information is taken as the semantic information of the theoretical pixel point. Then, it is determined that the semantic information B of the theoretical pixel point is different from the semantic information S of the three-dimensional point. A semantic error $m_i$ present between them can be expressed as follows:

$$m_i = \begin{cases} 1, & \text{semantic information same} \\ 0, & \text{semantic information different} \end{cases} \quad (10)$$

According to the formula (10), for each semantic error image, the semantic information of the pixel point of the actual position coordinate $p_i$ is $l_i$, and the semantic information of the theoretical pixel point of the theoretical position coordinate $p'_s$ is $l'_i$. If the semantic information of the pixel point is identical to the semantic information of the theoretical pixel point, the semantic error is 1 and otherwise the semantic error is 0.

For each semantic error image corresponding to each hypothesized pose, the total number $M_i$ of correct semantics is calculated in the following formula:

$$M_i = \Sigma m_i \quad (11)$$

In order to determine the optimal pose estimation, each hypothesized pose is traversed. The total number $N_i$ of correct positions and the total number $M_i$ of correct semantics corresponding to each hypothesized pose are determined according to the formulas (9) and (11). A hypothesized pose with a maximum total number of correct positions and a maximum total number of correct semantics is selected therefrom as the optimal pose estimation.

A localization effect that can be achieved based on the method of this embodiment is described below in combination with the experimental data.

Evaluation is performed using two evaluation indexes: one index is camera position and the other is camera orientation. The evaluation result is made in the form of a percentage that the position and the orientation of the target image reaches a given threshold, where the threshold includes a position threshold and an orientation threshold, the position threshold is in the form of Xm (X meter) and the orientation threshold is in the form of Y° (Y degrees). Three different threshold combinations may be adopted: (0.25 meters, 2°), (0.5 meters, 5°), and (5 meters, 10°). For example, the threshold combination (0.25 meters, 2°) refers to a percentage of the number of the images in which the final pose estimation and the true pose differ by less than 0.25 meters in position and by less than 2° in orientation to the total number of images after all images are tested.

TABLE 1

Test results of CMU dataset

| Method/dataset | CMU dataset | | |
|---|---|---|---|
| | City | Suburb | Park |
| Meter(m) | 0.25/0.5/5 | 0.25/0.5/5 | 0.25/0.5/5 |
| degree(deg) | 2/5/10 | 2/5/10 | 2/5/10 |
| AS | 55.2/60.3/65.1 | 20.7/25.9/29.9 | 12.7/16.3/20.8 |
| CSL | 36.7/42.0/53.1 | 8.6/11.7/21.1 | 7.0/9.6/17.0 |
| DenseVLAD | 22.2/48.7/92.8 | 9.9/26.6/85.2 | 10.3/27.0/77.0 |
| NetVLAD | 17.4/40.3/93.2 | 7.7/21.0/80.5 | 5.6/15.7/65.8 |
| Present application | 63.1/69.0/73.7 | 37.4/45.2/53.3 | 25.5/31.7/40.3 |

Table 1 show the test results under a city dataset of the CMU dataset. According to the test results, in all tested images under the data set in the method of the embodiment, the percentage of the number of the images in which the pose estimation result and the true pose differ by less than 0.25 meters in position and by less than 2° in orientation to the total number of images is 63.1%, the percentage of the number of the images in which the pose estimation result and the true pose differ by less than 0.5 meters in position and by less than 5° in orientation to the total number of images is 69.0%, and the percentage of the number of the images in which the pose estimation result and the true pose differ by less than 5 meters in position and by less than 10° in orientation to the total number of images is 73.7%.

According to the above test results, it can be known that the method of the embodiment is obviously superior to other methods in a challenging scene. It can be seen from the Table 1 that in the CMU dataset, the method of this embodiment is comprehensively superior to the methods of AS, CSL, DenseVLAD and NetVLAD. In the CMU dataset, the scene is more challenging due to influence of season and light irradiation and the like. For such type of scenes, the traditional methods such as AS and CSL have a greatly-reduced localization effect due to light irradiation, view point and repetitive structure and the like. In contrast, the method of this embodiment introduces semantic information and constructs a semantic error image so as to be more robust to some extent in a challenging scene.

TABLE 2

Test results of RobotCar Seasons dataset

| Method/dataset | RobotCar Seasons dataset | |
|---|---|---|
| | Day time | Night time |
| Meter (m) | 0.25/0.5/5 | 0.25/0.5/5 |
| Degree (deg) | 2/5/10 | 2/5/10 |
| AS | 35.6/67.9/90.4 | 0.9/2.1/4.3 |
| CSL | 45.3/73.5/90.1 | 0.6/2.6/7.2 |
| DenseVLAD | 7.4/31.1/91.0 | 1.0/4.5/22.7 |
| NetVLAD | 2.5/26.3/90.8 | 0.4/2.3/16.0 |
| Present application | 45.5/73.8/92.2 | 6.4/18.1/38.1 |

It can be known from the test results of the Table 2 that in a challenging scene, the method of this embodiment is superior to the traditional active search method, and the CSL method as well as DenseVLAD and NetVLAD based on image retrieval. It can be seen from the nighttime dataset that the day time and night time pose accuracies of Robot-CarSeasons dataset decrease significantly. Due to significant change of day time and night time, the localization effects of all methods decrease greatly. In this case, the localization accuracies of the methods based three-dimensional structure, such as active search and CSL decrease most significantly and even fail. In the significant change of the scene, the method of this embodiment is more robust and has applicability to the significant change of the scene.

It should be noted that the method of one or more embodiments of the present disclosure may be performed by a single device, for example, by one computer or server or the like. The method of this embodiment may also be applied to a distributed scene and performed by several devices through cooperation. In a case of the distributed scene, one of the several devices may perform only one or more steps of the method according to one or more embodiments of the present disclosure and the several devices may interact with each other to complete the method as above.

Specific embodiments of the present disclosure are described above. Other embodiments not described herein still fall within the scope of the appended claims. In some cases, the actions or steps recorded in the claims may be performed in a sequence different from the embodiments to achieve a desired result. Further, the processes shown in drawings do not necessarily require a particular sequence or a continuous sequence to achieve the desired result. In some embodiments, multi-task processing and parallel processing are possible and may also be advantageous.

Figure 5:
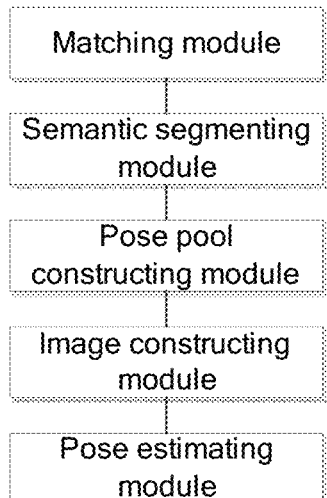
FIG. 5 is a structural schematic diagram of an apparatus according to one or more embodiments of the present disclosure.

As shown in FIG. 5, an embodiment of the present disclosure further provides a visual localization apparatus based on a semantic error image, including:

a semantic information determining module, configured to a two-dimensional semantic image and a three-dimensional semantic image of a target image, where each pixel point of the two-dimensional semantic image has corresponding two-dimensional semantic information, and each three-dimensional point of the three-dimensional semantic image has corresponding three-dimensional semantic information;

a matching module, configured to configured to determine at least one matching pair formed by the pixel point and the three-dimensional point matched in semantic information according to the two-dimensional semantic image and the three-dimensional semantic image;

a pose constructing module, configured to construct one group of hypothesized poses according to at least one matching pair;

an error image constructing module, configured to, for each hypothesized pose, construct a reprojection error image and a semantic error image; wherein the semantic error image is obtained in the following manner: obtaining a two-dimensional image by performing reprojection for the three-dimensional semantic image, assigning semantic information of each theoretical pixel point of the two-dimensional image to the semantic information of the corresponding pixel point of the two-dimensional semantic image, and then constructing the semantic error image based on a semantic error between the semantic information of each theoretical pixel point of the two-dimensional image and the semantic information of the correspondingly-matched three-dimensional point; and a pose estimating module, configured to select a hypothesized pose with a minimum reprojection error and a minimum semantic error as a pose estimation according to the reprojection error image and the semantic error image of each hypothesized pose.

For ease of descriptions, the above apparatus is divided into various modules functionally for respective descriptions. Of course, in one or more embodiments of the present disclosure, the functions of the various modules can be implemented in one or more softwares and/or hardwares.

The above apparatus of the embodiments is used to implement the corresponding method of the above embodiments and has the beneficial effects of the corresponding method embodiments and thus will not be repeated herein.

Figure 6:
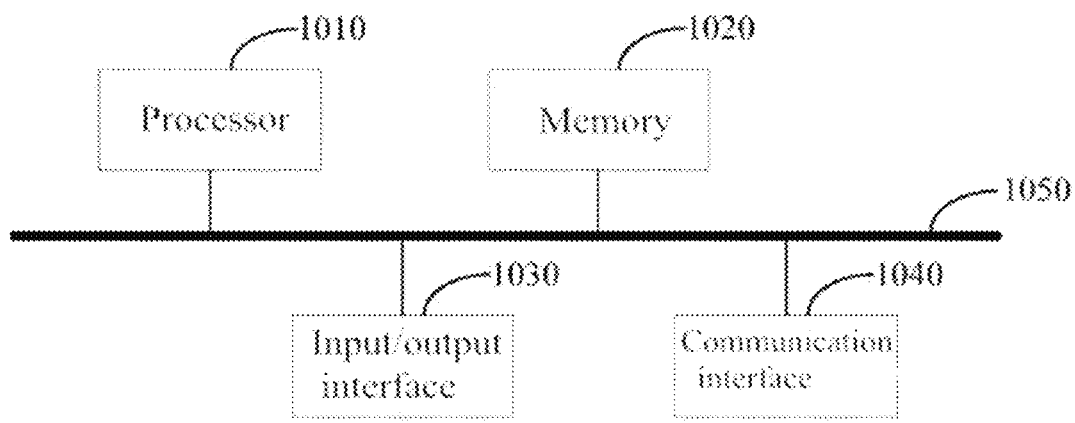
FIG. 6 is a structural schematic diagram of an electronic device according to one or more embodiments of the present disclosure.

FIG. 6 is a schematic diagram of a hardware structure of a more specific electronic device according to the present disclosure. The device may include a processor 1010, a memory 1020, an input/output interface 1030, a communication interface 1040 and a bus 1050. The processor 1010, the memory 1020, the input/output interface 1030 and the communication interface 1040 realize mutual communication connection inside the device through the bus 1050.

The processor 1010 may be implemented by a general Central Processing Unit (CPU), a microprocessor, an Application Specific Integrated Circuit (ASIC), or one or more integrated circuits or the like to execute relevant programs, so as to realize the technical solution according to the embodiments of the present disclosure.

The memory 1020 may be implemented in the form of Read Only Memory (ROM), Random Access Memory (RAM), static storage device or dynamic storage device or the like. The memory 1020 may store operating system and other application programs. When the technical solution according to the embodiments of the present disclosure is implemented by software or firmware, relevant program codes are stored in the memory 1020 and may be invoked by the processor 1010.

The input/output interface 1030 is used to connect an inputting/outputting module to realize information input and output. The inputting/outputting module may be configured in the device as a component (not shown) or externally connected at the device to provide corresponding functions. The inputting device may include keyboard, mouse, touch screen, microphone, and various sensors and the like, and the outputting device may include display, loudspeaker, vibrator and indicator lamp and the like.

The communication interface 1040 is used to connect a communication module (not shown) to realize mutual communication between the present device and other devices. The communication module may realize communication in a wired manner (for example, USB or network wire or the like) or in a wireless manner (for example, mobile network, WIFI or Bluetooth or the like).

The bus 1050 includes a passage through which information can be transmitted among various components of the device (for example, the processor 1010, the memory 1020, the input/output interface 1030 and the communication interface 1040).

It should be noted that although the above device only shows the processor 1010, the memory 1020, the input/output interface 1030, the communication interface 1040 and the bus 1050, the device may further include other components required to realize normal operation in a specific implementation process. In addition, those skilled in the art may understand that the above device may also only include the components necessary for the technical solution of the embodiments of the present disclosure rather than include all components shown in the drawings.

In the embodiments of the present disclosure, the computer readable medium includes permanent, non-permanent, mobile and non-mobile media, which can realize information storage by any method or technology. The information may be computer readable instructions, data structures, program modules and other data. The examples of the computer storage medium include but not limited to: phase change random access memory (PRAM), a Static Random Access Memory (SRAM), a Dynamic Random Access Memory (DRAM), and other types of RAMs, Read-Only Memory (ROM), an Electrically-Erasable Programmable Read-Only Memory (EEPROM), a Flash Memory, or other memory technology, CD-ROM, digital versatile disc (DVD) or other optical storage, cassette type magnetic tape, magnetic disk storage or other magnetic storage device or other non-transmission medium for storing information accessible by computing devices.

Persons of ordinary skill in the art should understand that the descriptions of the above embodiments are merely illustrative and shall not be intended to imply that the scope of protection of the present disclosure (including the claims) is limited to these embodiments. Based on the idea of the present disclosure, the technical features of the above embodiments or different embodiments can be combined, the steps may be performed in any sequence, and many other changes may be present in different aspects of one or more embodiments of the present disclosure as described above and are not mentioned in the details for simplification.

Furthermore, in order to simplify descriptions and discussions, and make one or more embodiments of the present disclosure not difficult to understand, the well-known power sources/grounding connections of integrated circuit chips or other components may be shown or not shown in the accompanying drawings. In addition, the apparatus may be shown in the form of block diagram to avoid making one or more embodiments of the present disclosure difficult to understand, and considerations are given to the following fact, i.e. the details of the implementations of these block diagrams of the apparatus are highly dependent on a platform for implementing one or more embodiments of the present disclosure (i.e. these details should be completely within the understanding scope of those skilled in the art). In a case that specific details (for example, circuit) are made to describe the exemplary embodiments of the present disclosure, it is apparent to those skilled in the art that one or more embodiments of the present disclosure can be implemented without these specific details or in a case of change of these specific details. As a result, these descriptions shall be considered as explanatory rather than limiting.

Although the present disclosure is described in combination with the specific embodiments of the present disclosure, many substitutions, modifications and variations of these embodiments become apparent to those skilled in the art according to the above descriptions. For example, other memory architecture (for example, DRAM) may use the embodiment discussed herein.

One or more embodiments of the present disclosure are intended to cover all such substitutions, modifications and variations within the broad scope of the appended claims. Therefore, any omissions, modifications, equivalent substitutions, and improvements and the like made within the spirit and principle of one or more embodiments of the present disclosure shall all fall within the scope of protection of the present disclosure.

What is claimed is:

1. A visual localization method based on a semantic error image, comprising:
    performing feature extraction for a target image, and obtaining at least one matching pair by performing feature matching for each extracted feature point and each three-dimensional point of a constructed three-dimensional scene model, wherein each matching pair comprises a pixel point of the target image and the three-dimensional point of the three-dimensional scene model which are matched in feature;
    obtaining a two-dimensional semantic image of the target image by performing semantic segmentation for the target image, wherein each pixel point of the two-dimensional semantic image has corresponding semantic information; and determining semantic information of each matching pair according to the semantic information of each pixel of the two-dimensional semantic image;
    constructing a hypothesized pose pool comprising at least one hypothesized pose according to at least one matching pair;
    for each hypothesized pose in the hypothesized pose pool, constructing a reprojection error image and a semantic error image; wherein the semantic error image is obtained in the following manner: constructing a three-dimensional semantic image by using the three-dimensional points in all matching pairs, obtaining a two-dimensional image by performing reprojection for the three-dimensional semantic image according to a current hypothesized pose, assigning semantic information of each theoretical pixel point of the two-dimensional image to the semantic information of the corresponding pixel point of the two-dimensional semantic image, and then constructing the semantic error image based on a semantic error between the semantic information of each theoretical pixel point of the two-dimensional image and the semantic information of the correspondingly-matched three-dimensional point;
    determining a hypothesized pose with a minimum reprojection error and a minimum semantic error as a pose estimation according to the reprojection error image and the semantic error image of each hypothesized pose.

2. The method according to claim 1, wherein constructing the hypothesized pose pool comprises:
    selecting four matching pairs randomly from all matching pairs, obtaining one hypothesized pose through calculation according to a PNP (perspective-n-point) algorithm and the four selected matching pairs, and constructing the hypothesized pose pool by using all hypothesized poses obtained based on the random combination of all matching pairs.

3. The method according to claim 2, wherein the hypothesized pose is calculated in the following formula:

$$h_1 = -R^{-1} * t \quad (5)$$

wherein R is a rotation matrix, and t is a translation matrix.

4. The method according to claim 1, wherein selecting the hypothesized pose with the minimum reprojection error and the minimum semantic error as the pose estimation according to the reprojection error image and the semantic error image of each hypothesized pose comprises:
    calculating a total number of correct positions according to the reprojection error image corresponding to each hypothesized pose;
    calculating a total number of correct semantics according to the semantic error image corresponding to each hypothesized pose;
    selecting a hypothesized pose with the maximum total number of correct positions and the maximum total number of correct semantics as an optimal pose estimation.

5. The method according to claim 4, wherein calculating the total number of correct positions according to the reprojection error image corresponding to each hypothesized pose comprises the followings:
    for each hypothesized pose $h_j$, j=1, 2 . . . n, the three-dimensional semantic image is reprojected as the two-dimensional image according to the hypothesized pose $h_j$, wherein based on a position coordinate $y_i$ of any three-dimensional point i, a theoretical position coordinate $p'_i$ of the theoretical pixel point of the two-dimensional image obtained through projection is expressed as follows:

$$p'_i = Ch_j y_i = Ch_j \begin{bmatrix} X_i \\ Y_i \\ Z_i \end{bmatrix} \quad (6)$$

wherein $X_i$, $Y_i$ and $Z_i$ are the position coordinates of the three-dimensional point i in x, y and z directions, and C is a camera projection matrix;
    a reprojection error $e_i$ present between the theoretical position coordinate $p'_i$ of the theoretical pixel point i' of the two-dimensional image and an actual position coordinate $p_1$ of the pixel point i of the two-dimensional semantic image is expressed as follows:

$$e_i \|p_i - p'_i\| = \|p_i - Ch_j y_i\| \quad (7)$$

the reprojection error image is constructed based on the reprojection error $e_i$ and an inlier threshold $\tau$ of the matching pair is set, such that, $$n_i = \begin{cases} 1, & e_i < \tau \\ 0, & e_i \geq \tau \end{cases} \quad (8)$$

if the reprojection error $e_i$ is smaller than the inlier threshold $\tau$, the theoretical pixel point of the two-dimensional image obtained through projection based on the hypothesized pose is consistent in position with the corresponding pixel point of the two-dimensional semantic image, which is called correct position;

for the reprojection error image corresponding to each hypothesized pose, a total number $N_i$ of inliers is calculated and the total number of correct positions is calculated as follows:

$$N_i = \Sigma n_i \quad (9).$$

6. The method according to claim 5, wherein calculating the total number of correct semantics according to the semantic error image corresponding to each hypothesized pose comprises:

determining a semantic error $m_i$ present between the semantic information of the theoretical pixel point of the two-dimensional image and the semantic information of the three-dimensional point;

$$m_i = \begin{cases} 1, & \text{semantic information same} \\ 0, & \text{semantic information different} \end{cases} \quad (10)$$

for the semantic error image corresponding to each hypothesized pose, calculating the total number of the correct semantics $M_i$:

$$M_i = \Sigma m_i \quad (11).$$

7. A visual localization apparatus based on a semantic error image, comprising:

a matching module, configured to perform feature extraction for a target image, and obtain at least one matching pair by performing feature matching for each extracted feature point and each three-dimensional point of a constructed three-dimensional scene model, wherein each matching pair comprises a pixel point of the target image and the three-dimensional point of the three-dimensional scene model which are matched in feature;

a semantic segmenting module, configured to: obtain a two-dimensional semantic image of the target image by performing semantic segmentation for the target image, wherein each pixel point of the two-dimensional semantic image has corresponding semantic information; and determine semantic information of each matching pair according to the semantic information of each pixel of the two-dimensional semantic image;

a pose pool constructing module, configured to construct a hypothesized pose pool comprising at least one hypothesized pose according to at least one matching pair;

an image constructing module, configured to, for each hypothesized pose in the hypothesized pose pool, construct a reprojection error image and a semantic error image; wherein the semantic error image is obtained in the following manner: constructing a three-dimensional semantic image by using the three-dimensional points in all matching pairs, obtaining a two-dimensional image by performing reprojection for the three-dimensional semantic image according to a current hypothesized pose, assigning semantic information of each theoretical pixel point of the two-dimensional image to the semantic information of the corresponding pixel point of the two-dimensional semantic image, and then constructing the semantic error image based on a semantic error between the semantic information of each theoretical pixel point of the two-dimensional image and the semantic information of the correspondingly-matched three-dimensional point;

a pose estimating module, configured to determine a hypothesized pose with a minimum reprojection error and a minimum semantic error as a pose estimation according to the reprojection error image and the semantic error image of each hypothesized pose.

8. The apparatus according to claim 7, wherein, the pose pool constructing module is configured to: select four matching pairs randomly from all matching pairs, obtain one hypothesized pose through calculation according to a PNP (perspective-n-point) algorithm and the four selected matching pairs, and construct the hypothesized pose pool by using all hypothesized poses obtained based on the random combination of all matching pairs.

9. The apparatus according to claim 8, wherein the hypothesized pose is calculated in the following formula:

$$h_1 = -R^{-1} * t \quad (5)$$

wherein R is a rotation matrix and t is a translation matrix.

10. The apparatus according to claim 7, wherein, the pose estimating module is configured to: calculate a total number of correct positions according to the reprojection error image corresponding to each hypothesized pose; calculate a total number of correct semantics according to the semantic error image corresponding to each hypothesized pose; and select a hypothesized pose with a maximum total number of correct positions and a maximum total number of correct semantics as an optimal pose estimation.

* * * * *